(12) United States Patent
Nakashima

(10) Patent No.: US 11,539,547 B2
(45) Date of Patent: Dec. 27, 2022

(54) NETWORK SYSTEM, INFORMATION PROCESSING METHOD, SERVER, AND REFRIGERATOR

(71) Applicant: Sharp Kabushiki Kaisha, Sakai (JP)

(72) Inventor: Takashi Nakashima, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 297 days.

(21) Appl. No.: 16/779,538

(22) Filed: Jan. 31, 2020

(65) Prior Publication Data

US 2020/0252231 A1     Aug. 6, 2020

(30) Foreign Application Priority Data

Feb. 1, 2019 (JP) .............................. JP2019-016635

(51) Int. Cl.
*F25D 29/00* (2006.01)
*H04L 12/28* (2006.01)
*F25D 23/02* (2006.01)

(52) U.S. Cl.
CPC ........ *H04L 12/2823* (2013.01); *F25D 23/028* (2013.01); *F25D 29/005* (2013.01); *F25D 2600/06* (2013.01); *F25D 2700/02* (2013.01)

(58) Field of Classification Search
CPC .. F25D 23/028; F25D 29/005; F25D 2600/06; F25D 2700/02; H04L 12/2823
See application file for complete search history.

(56) References Cited

U.S. PATENT DOCUMENTS

2011/0273998 A1   11/2011  Mudrick et al.
2015/0150088 A1*   5/2015  Haga ....................... H04L 12/28
                                                            726/3

FOREIGN PATENT DOCUMENTS

| CN | 1501043 A    | 6/2004  |
| CN | 102907045 A  | 1/2013  |
| CN | 105115241 A  | 12/2015 |
| JP | 2003185315 A | 7/2003  |
| JP | 2014040947 A | 3/2014  |
| JP | 2016148991 A | 8/2016  |

OTHER PUBLICATIONS

KR 2008 0026333 (English translation) (Year: 2008).*

* cited by examiner

*Primary Examiner* — Jonathan Bradford
(74) *Attorney, Agent, or Firm* — ScienBiziP, P.C.

(57) ABSTRACT

A network system includes a refrigerator, a terminal, and a server that is capable of communicating with the refrigerator and the terminal and that provides, to the terminal, at least information based on an opening/closing operation of a door of the refrigerator. When the refrigerator starts an eco-mode, the server restricts an operation related to the watching service.

5 Claims, 12 Drawing Sheets

FIG.7

| USER ID | USER NAME | AGE | ADDRESS |
|---|---|---|---|
| ⋮ | ⋮ | ⋮ | ⋮ |

| REFRIGERATOR ID | MODEL NAME | MODEL NUMBER | DATE/TIME OF STARTING LEARNING | DEVICE OWNER |
|---|---|---|---|---|
| ⋮ | ⋮ | ⋮ | ⋮ | ⋮ |

| REFRIGERATOR ID | USER ID | NICKNAME | DATE/TIME OF PARING | NOTIFICATION SETTING |
|---|---|---|---|---|
| ⋮ | ⋮ | ⋮ | ⋮ | ⋮ |

| REFRIGERATOR ID | OPERATION HISTORY |
|---|---|
| ⋮ | ⋮ |

| REFRIGERATOR ID | TIME ZONE | DAY OF WEEK | POSSIBILITY OF OCCURRENCE OF OPENING/CLOSING |
|---|---|---|---|
| ⋮ | ⋮ | ⋮ | ⋮ |

125

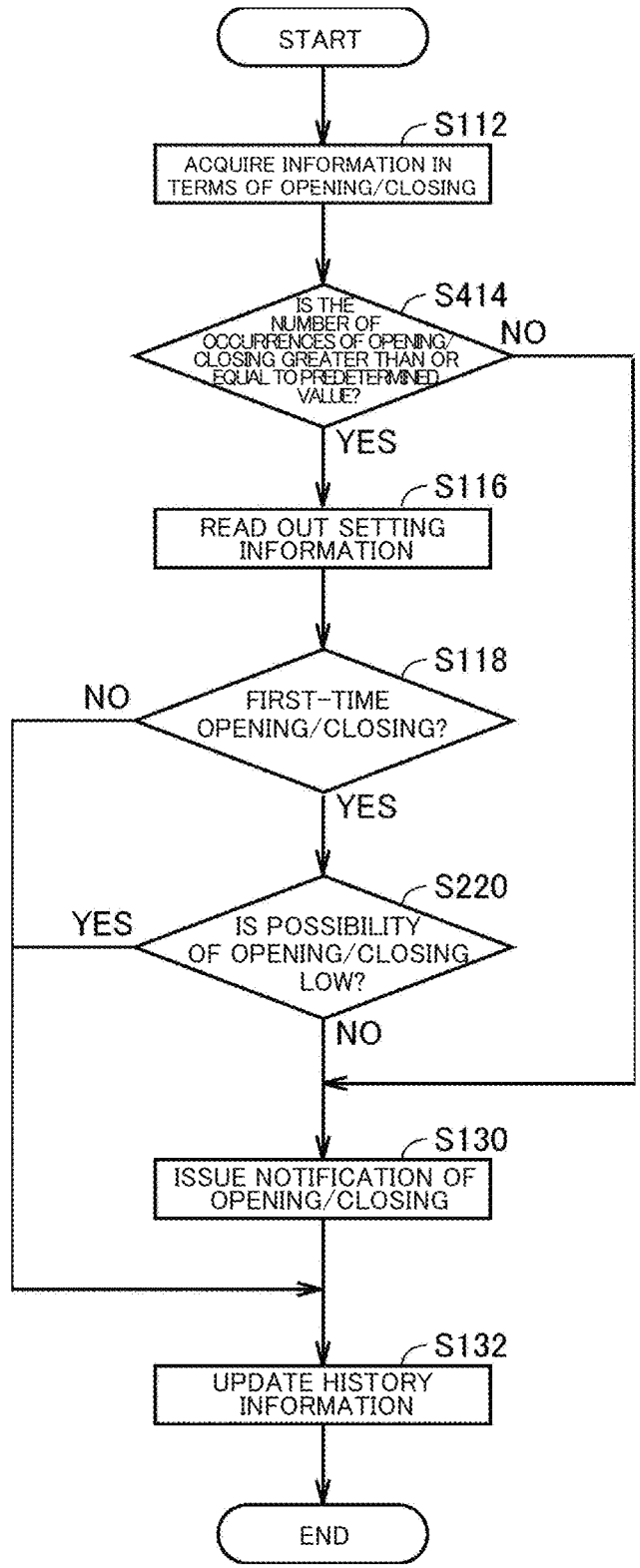

NETWORK SYSTEM, INFORMATION PROCESSING METHOD, SERVER, AND REFRIGERATOR

BACKGROUND

1. Field

The present disclosure relates to a remote watching service, and more specifically to a technology related to a watching service using a refrigerator.

2. Description of the Related Art

Conventionally, a technology related to a remote watching service via a network is known. For example, Japanese Unexamined Patent Application Publication No. 2016-148991 discloses a safety confirmation system and a refrigerator. This safety confirmation system includes a refrigerator and an external device capable of connecting to the refrigerator via the Internet, wherein the refrigerator includes a voice/sound input/output means and one of the following: a human sensor; a door open/close sensor; and an operation unit. In this safety confirmation system, if a detection signal output by the human sensor, a detection signal output by the door open/close sensor, or an input signal to the operation unit is transmitted, then, in response, initial utterance mean performs control to utter to a watched person via voice/sound input/output means. When, in response to this utterance, the watched person utters something, the utterance is input to the voice/sound input/output means, and safety information acquisition means acquires voice/sound data corresponding to the input utterance. Safety state recognition means recognizes a safety state by analyzing the voice/sound data and generates safety information. Reutterance means performs control to again utter to the watched person depending on the safety state. The safety information is stored in the external device. Safety information confirmation means connected to the external device via the Internet provides the safety information in a viewable manner.

Japanese Unexamined Patent Application Publication No. 2003-185315 discloses a refrigerator safety confirmation apparatus. This refrigerator safety confirmation apparatus includes open/close occurrence counting means configured to count the number of times that an opening/closing door of a refrigerator is opened/closed, and signal transmission means configured to, in a case where the number of times that the opening/closing door is opened/closed in a predetermined fixed period is smaller than or equal to a setting value, transmit information to a preregistered electronic terminal.

In an aspect, the present disclosure provides a network system, an information processing method, and a server, for realizing a watching service that is more convenient and easier to use than those according to conventional techniques.

SUMMARY

According to an aspect of the present disclosure, a network system includes a refrigerator, a terminal, and a server capable of communicating with the refrigerator and the terminal and configured to provide, as a watching service, at least information based on an operation of opening/closing a door of the refrigerator to the terminal. When the refrigerator starts an eco-mode, the server restricts an operation related to the watching service.

BRIEF DESCRIPTION OF THE DRAWINGS

FIG. 7 is a conceptual diagram illustrating user information data according to the first embodiment;

FIG. 8 is a conceptual diagram illustrating device information data according to the first embodiment;

FIG. 9 is a conceptual diagram illustrating pairing data according to the first embodiment;

FIG. 10 is a conceptual diagram illustrating history data according to the first embodiment;

FIG. 11 is a conceptual diagram illustrating opening/closing possibility data according to the first embodiment;

FIG. 17 is a flow chart illustrating information processing relating to an opening/closing occurrence notification according to a fourth embodiment.

DESCRIPTION OF THE EMBODIMENTS

Figure 1:
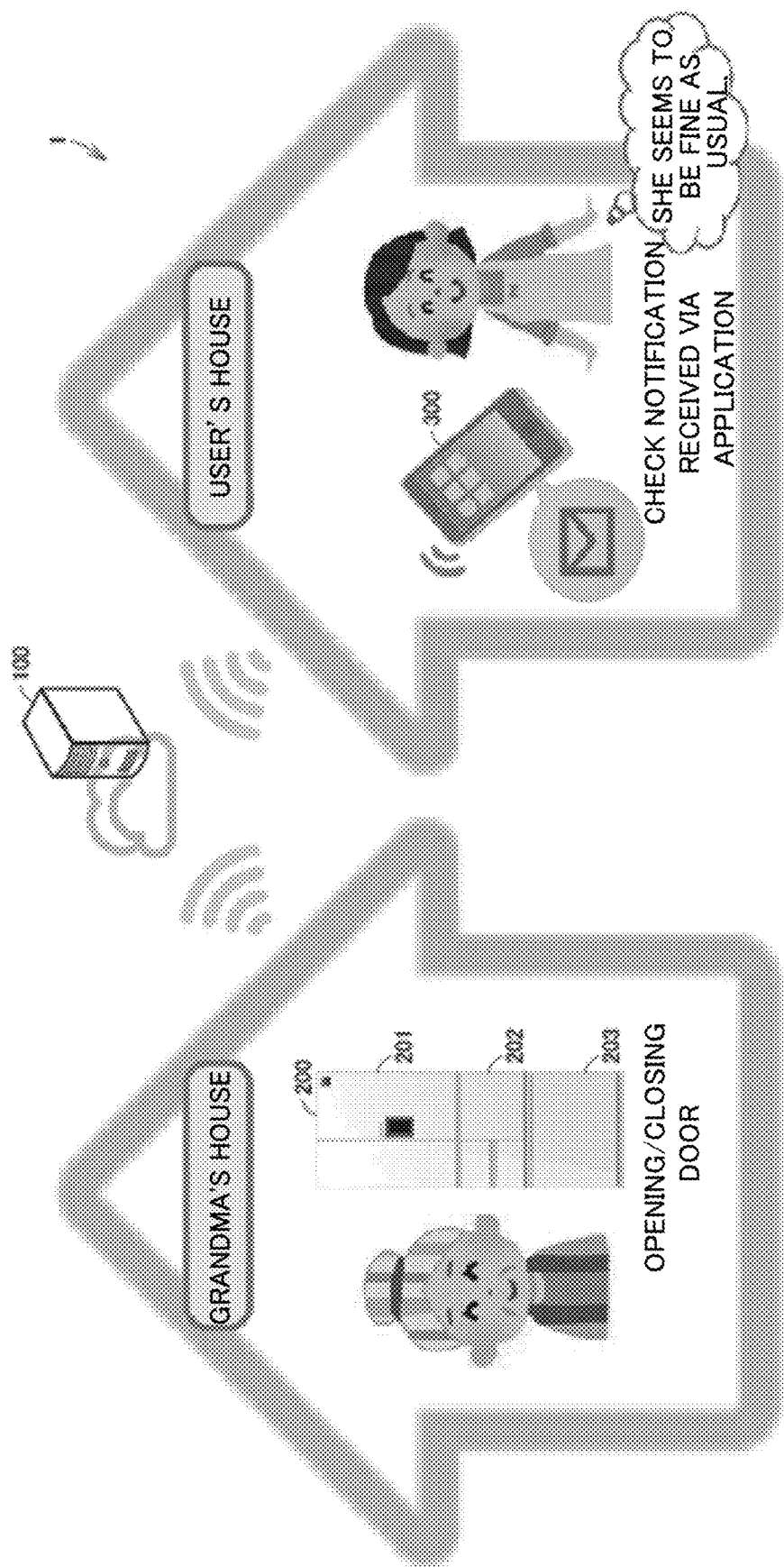
FIG. 1 is a conceptual diagram illustrating an overall configuration of a network system according to a first embodiment.

Present disclosure is described below with reference to embodiments in conjunction with the accompanying drawings. In the following description, the same parts are denoted by the same reference numerals. Note that parts denoted by the same reference numerals are the same in terms of the name and the function. Thus a duplicated description thereof is not given.

First Embodiment

Overall Configuration of Network System 1

First, referring to FIG. 1, an overall configuration of a network system 1 according to a first embodiment is described. FIG. 1 is a conceptual diagram illustrating an overall configuration of a network system according to a first embodiment.

In the present embodiment, the network system 1 includes a watching server 100, an electric apparatus such as a refrigerator 200, and a communication terminal 300 such as a smartphone. In the present embodiment, the electric apparatus such as the refrigerator 200 and the communication terminal 300 such as the smartphone are configured to be connectable to the watching server 100 via Wi-Fi (registered trademark), Bluetooth (registered trademark), ZigBee (registered trademark), a carrier network, the Internet, or the like.

Note that the communication terminal 300 is not limited to the smartphone, but the communication terminal 300 may be a personal computer, a tablet device, a game machine, a wearable terminal, or the like.

In the present embodiment, the watching server 100 provides, as one of functions included in the watching service, a service in which information on a first user is provided to the communication terminal 300 of a second user who is a person watching the first user, based on an operation performed on a refrigerator 200 in a first user's home being watched, such as opening/closing of a door 201, 202, or 203.

Outline of Operation of Network System 1

Figure 2:
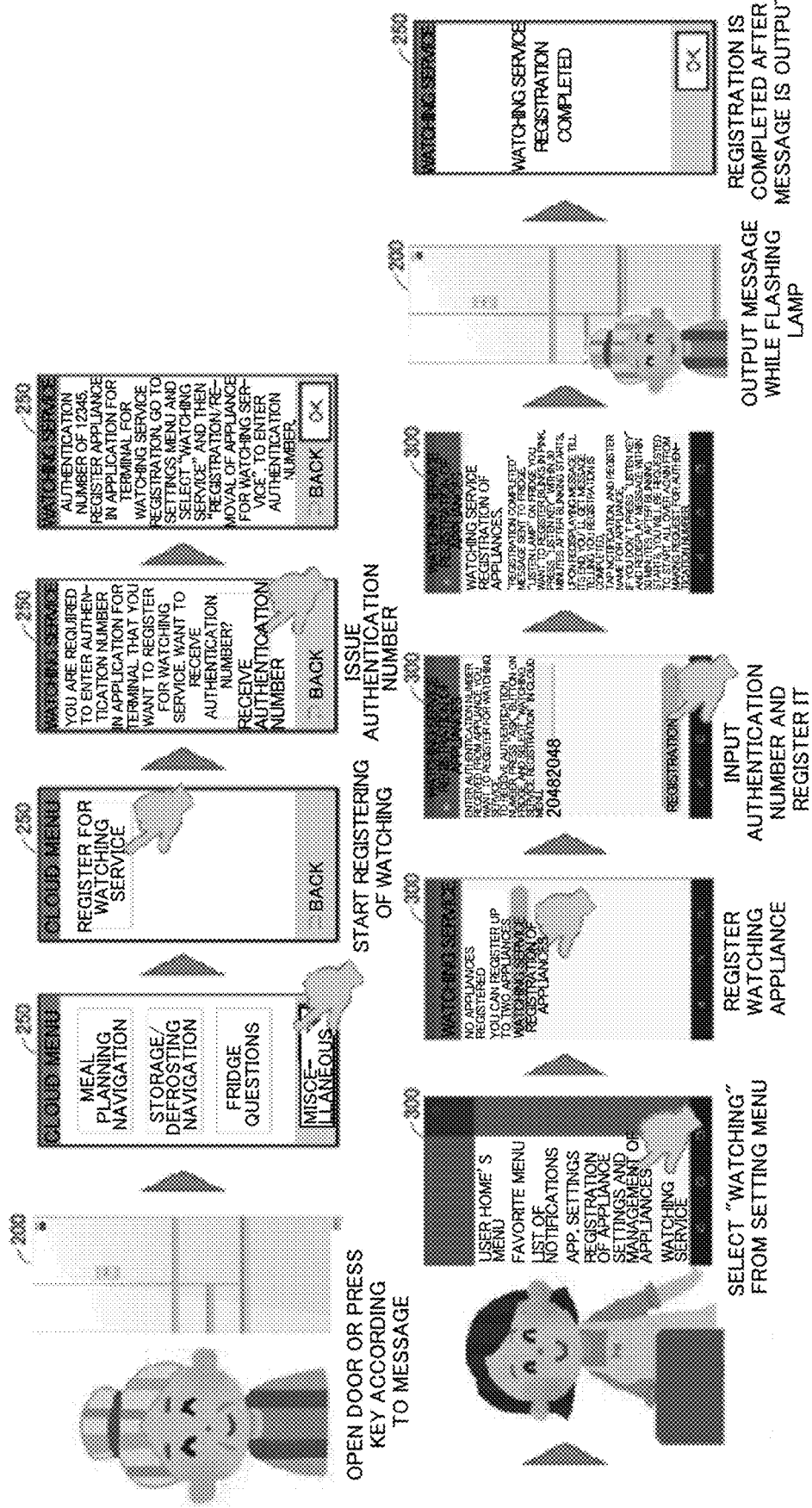
FIG. 2 is a conceptual diagram illustrating a pairing process in the network system according to the first embodiment.
Figure 3:
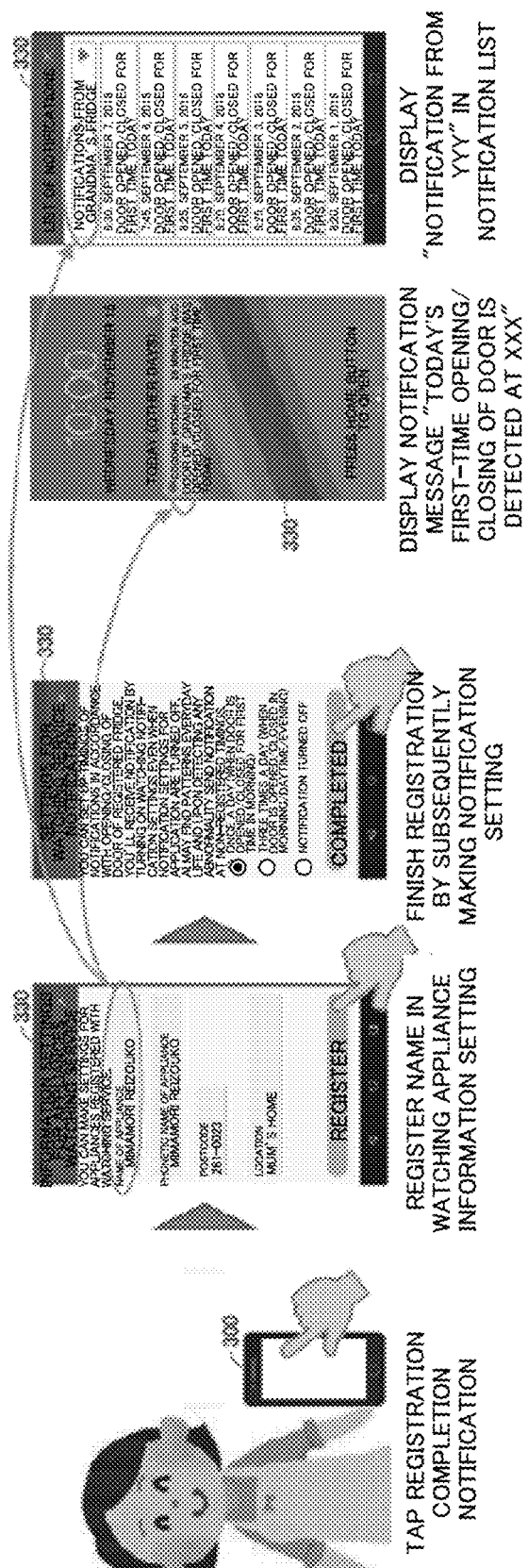
FIG. 3 is a conceptual diagram illustrating a manner in which transitions of a screen on a communication terminal occur when a registration is completed according to the first embodiment.

Next, referring to FIGS. 2 to 4, an outline of an operation of the network system 1 according to the present embodiment is described below. First, referring to FIG. 2, a description is given as to a process, using the watching server 100, to pair the refrigerator 200 in the first user's home to be watched with the communication terminal 300 of the second user who is to watch the first user.

First, using a touch panel 250 provided on the refrigerator 200 or another input interface, the first user selects a "watching registration" process from a menu of a service using a cloud. The first user instructs the refrigerator 200 to issue an authentication number. The refrigerator 200 requests the watching server 100 or an authentication server to issue the authentication number. The refrigerator 200 receives the authentication number from the watching server 100 or the authentication server, and displays the received authentication number.

Concurrently, the second user starts an application for the watching service on the communication terminal 300. The second user selects a "watching" process from a setting screen displayed on the display 330. Subsequently, the second user selects a "watching electrical appliance registration" process. The communication terminal 300 prompts to input numeric characters output by the refrigerator 200 to be watched.

This makes it possible for the second user to input an authentication number to the communication terminal 300. More specifically, the second user is allowed to acquire the authentication number output by the refrigerator 200 and input the acquired authentication number to the communication terminal 300 by performing an operation in front of the refrigerator 200 in the first user's home while holding the communication terminal 300. Alternatively, in a case where the second user is located away from the refrigerator 200, the first user may notify the second user of the authentication number via telephone or SNS, and the second user may input the received authentication number to the communication terminal 300.

In response, the communication terminal 300 transmits the input authentication number to the watching server 100. The watching server 100 performs a first authentication process based on the information received from the communication terminal 300. More specifically, when the watching server 100 receives the authentication number from the communication terminal 300 within a predetermined period of time, for example, 30 minutes since the authentication number is issued to the refrigerator 200, the watching server 100 determines that the first authentication is passed successfully. The watching server 100 returns a result of the first authentication to the communication terminal 300.

In the present embodiment, the watching server 100 also provides information specifying an operation to be performed on the refrigerator 200 to the communication terminal 300 together with the result of the first authentication. For example, when the first authentication is passed successfully, the watching server 100 controls the communication terminal 300 to output information instructing to press a specific button of the refrigerator 200, for example, a message output button or the like.

As a result, for example, the second user is allowed to perform an operation on the refrigerator 200 for the authentication output by the communication terminal 300 by pressing the specific button of the refrigerator 200 in the first user's home while holding the communication terminal 300. Alternatively, in a case where the second user is located away from the refrigerator 200, the second user may notify the first user of the operation to be performed on the refrigerator 200 via telephone or SNS thereby making it possible for the first user to perform the operation on the refrigerator 200.

The refrigerator 200 transmits the accepted operation to the watching server 100. The watching server 100 performs a second authentication process based on the operation performed on the refrigerator 200. More specifically, when the watching server 100 receives operation information from the refrigerator 200 within a predetermined period of time, for example, 30 minutes, since the transmission of the information on the operation to the communication terminal 300, the watching server 100 determines that the second authentication is passed successfully. The watching server 100 returns a result of the second authentication to the communication terminal 300 and the refrigerator 200.

In the present embodiment, when the second authentication is passed successfully, the watching server 100 permits pairing between the refrigerator 200 and the communication terminal 300. More specifically, after the pairing, as illustrated in FIG. 3, it becomes possible, in the communication terminal 300, to register a nickname of the refrigerator 200 or set the frequency of the watching notification. Finally, it becomes possible to view, via the communication terminal 300, history of operations on the refrigerator 200.

In the present embodiment, the second user is allowed to freely set the frequency of the watching notification from the following patterns: (1) when the door of the refrigerator 200 is opened for the first time in a day, a notification is given to the communication terminal 300; (2) when the door of the refrigerator 200 is opened for the first time in each predetermined period of time in a day, a notification is given to the communication terminal 300; (3) even when the door of the refrigerator 200 is opened, no notification is given.

In the case of (2), for example, the door of the refrigerator 200 is opened for the first time in each of three periods, that is, a morning period, an afternoon period, and a night period, a notification may be given. The morning period may be defined, for example, as a period from 5:00 to 11:59. The afternoon period may be defined, for example, as a period from 12:00 to 16:59. The night period may be defined, for example, as a period from 17:00 to 23:59. Note that each period may be divided into further periods.

Note that the timing of setting the frequency of the watching notification is not limited to the timing immediately after the completion of the authentication process, but at any timing, the second user may set the frequency of the watching notification via the setting screen.

After the pairing process is completed in the above-described manner, when the door of the refrigerator 200 is opened, the watching server 100 transmits information on the opening/closing of the door of the refrigerator 200 to the communication terminal 300 based on the frequency of the watching notification. In response, as illustrated in FIG. 3, a watching notification is displayed in a pop-up manner on the display 330 of the communication terminal 300. If the second user touches the display 330, the communication terminal 300 displays detailed history regarding the opening/closing of the door of the refrigerator 200.

Note that not only when a notification is given by the watching server 100, but at any timing when the second user selects a "notification list" from the setting screen, the communication terminal 300 may display the detailed history of the opening/closing of the door of the refrigerator 200. Note that the communication terminal 300 may request the watching server 100 to provide information on the opening/closing of the refrigerator 200 depending on the selection of "notification list", or may display information stored in advance.

In the present embodiment, the first user or the second user may input an instruction to release the watching mode by using the refrigerator 200. Furthermore, the first user or the second user may also input an instruction to release the watching mode by using the communication terminal 300.

In the present embodiment, as described above, the watching server 100 acquires information on an operation performed on the refrigerator 200 and provides the acquired information to the communication terminal 300 thereby making it possible for the second user to know about the safety of the first user. A specific configuration of the network system 1 for realizing the above-described function is described in detail below.

Configuration of Refrigerator 200

Figure 4:
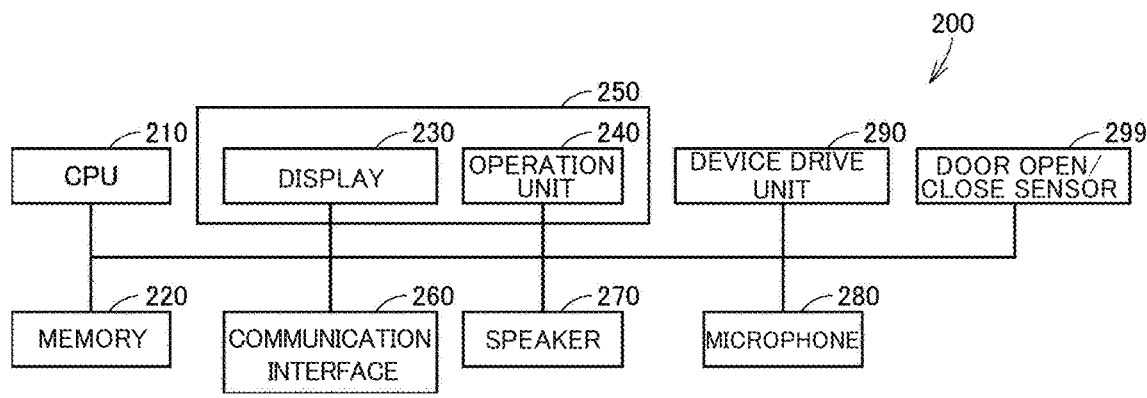
FIG. 4 is a block diagram illustrating a configuration of a refrigerator according to the first embodiment.

Referring to FIG. 4, an example of a configuration of the refrigerator 200 in the network system 1 is described below. In the present embodiment, the refrigerator 200 includes a CPU 210, a memory 220, a display 230, an operation unit 240, a communication interface 260, a speaker 270, a microphone 280, a device drive unit 290, a door open/close sensor 299, doors 201, 202, and 203 (see FIG. 1), etc.

The CPU 210 controls various parts of the refrigerator 200 by executing a program stored in the memory 220 or an external storage medium.

The memory 220 may be realized by various kinds of RAMS or various kinds of ROMs. The memory 220 may be disposed in the refrigerator 200, or the memory 220 may be removably connectable to various interfaces of the refrigerator 200. Alternatively, the memory 220 may be a storage medium disposed in another apparatus acceptable by the refrigerator 200. The memory 220 stores a program executed by the CPU 210, data generated in the execution of the program by the CPU 210, data input via the operation unit 240, data received from the watching server 100 via a router or the Internet, etc.

The display 230 outputs a character, an image, and/or the like based on a signal received from the CPU 210. Note that the display 230 may be a simple LED light or the like.

The operation unit 240 may be realized using a button, a touch panel, and/or the like. The operation unit 240 accepts an instruction from a user and inputs the accepted instruction to the CPU 210. Note that the display 230 and the operation unit 240 may together form the touch panel 250.

The communication interface 260 may be realized using a communication module such as a wireless LAN module or a wired LAN module. The communication interface 260 transmits and receives data to and from another apparatus such as the watching server 100 via a router and/or the Internet and/or the like using wire communication or wireless communication. That is, the CPU 210 transmits, via the communication interface 260, information indicating an operation of opening/closing a door, a current operation state, an operation instruction, and/or the like to another apparatus such as the watching server 100. Conversely, the CPU 210 receives various kinds of information such as an operation instruction, voice/sound data, and/or the like from another apparatus such as the watching server 100.

The speaker 270 outputs a voice message and/or the like based on voice/sound data supplied from the CPU 210. The microphone 280 acquires a voice of a user and/or the like and inputs corresponding voice/sound data to the CPU 110.

The device drive unit 290 controls various parts (such as a compressor motor, a fan, a light, and/or the like) of an electric apparatus based on a signal supplied from the CPU 210.

The door open/close sensor 299 detects an open state or a closed state of each door and inputs a detection result to the CPU 210.

Configuration of Communication Terminal 300

Figure 5:
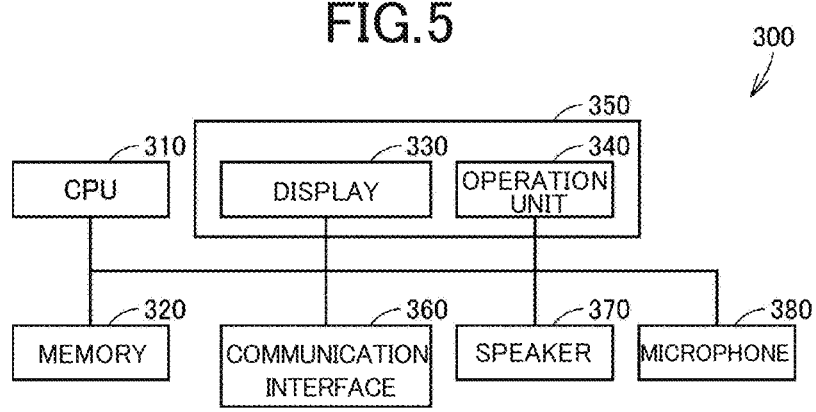
FIG. 5 is a block diagram illustrating a configuration of a communication terminal according to the first embodiment.

Next, referring to FIG. 5, an example of a configuration of the communication terminal 300 in the network system 1 is described below. In the present embodiment, the communication terminal 300 includes a CPU 310, a memory 320, a display 330, an operation unit 340, a communication interface 360, a speaker 370, and a microphone 380.

The CPU 310 controls various parts of the communication terminal 300 by executing a program stored in the memory 320.

The memory 320 may be realized by using various kinds of RAMS, various kinds of ROMS, and/or the like. The memory 320 stores an application program for various services, data generated via the execution of a program by the CPU 310, data received from the watching server 100, data input via the operation unit 340, and data or the like used in a service according to the present embodiment.

The display 330 displays an image or text information based on data supplied from the CPU 310. The operation unit 340 includes a pointing device or a switch and/or the like. The operation unit 340 transfers various instructions received from a user to the CPU 310. Note that the terminal may include a touch panel 350 including the display 330 and the operation unit 340.

The communication interface 360 transmits and receives data to and from another apparatus such as the watching server 100 or the refrigerator 200 via the Internet or a carrier network. For example, according to an application program for watching service, the CPU 310 acquires a history of opening/closing from the watching server 100 via the communication interface 360, transmits an operation instruction, a message, or the like to the watching server 100, and transmits and receives other various kinds of information used in the watching service.

Configuration of Watching Server 100

Figure 6:
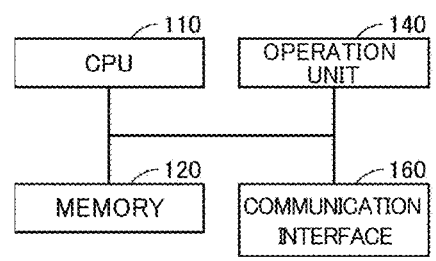
FIG. 6 is a block diagram illustrating a configuration of a watching server according to the first embodiment.

First, an example of a configuration of the watching server 100 in the network system 1 according to the present embodiment is described. Referring to FIG. 6, the watching server 100 includes a CPU 110, a memory 120, an operation unit 140, and a communication interface 160.

The CPU 110 controls various parts of the watching server 100 by executing a program stored in the memory 120. For example, the CPU 110 performs various processes described later by executing a program stored in the memory 120 and referring various kinds of data.

The memory 120 may be realized using various kinds of RAMS, and/or various kinds of ROMS, and/or the like. The memory 120 may be disposed in the watching server 100, or the memory 120 may be removably connectable to various interfaces of the watching server 100, or the memory 120 may be a storage medium of another apparatus acceptable by the watching server 100. The memory 120 stores a program executed by the CPU 110, data generated via the execution of a program by the CPU 110, data acquired from the refrigerator 200 or the communication terminal 300, and data or the like used in a service according to the present embodiment.

For example, as shown in FIG. 7, the memory 120 stores user information data 121. In the user information data 121, user identification information, a user name, and other information related to a user are described individually for each user registered in the watching service.

Furthermore, as shown in FIG. 8, the memory 120 also stores device information data 122. In the device information data 122, identification information of the refrigerator 200, a model name of the refrigerator 200, a model number of the refrigerator 200, date/time of starting learning of the operation of opening/closing a door, and other information related to the refrigerator 200 are described individually for each refrigerator 200 registered in the watching service. The date/time of starting learning the operation of opening/closing a door may be date/time when a main power supply of the refrigerator 200 is turned on, or may be datetime when the refrigerator 200 is paired with the communication terminal 300 for the first time, or may be date/time of accepting, from the refrigerator 200 or the communication terminal 300, information indicating that leering of the opening/closing operation is started.

Furthermore, as shown in FIG. 9, the memory 120 also stores pairing data 123. The pairing data 123 describes a correspondence between the refrigerator 200, which is successfully paired in terms of watching service, and the second user or the communication terminal 300. In the present embodiment, a nickname of the target refrigerator 200, for example, "grandma's refrigerator", "father's fridge", or the like is described individually for each second user or communication terminal 300. Furthermore, in the present embodiment, setting information in terms of the frequency of the watching notification using the refrigerator 200 of interest stored for each second user.

Furthermore, as shown in FIG. 10, the memory 120 also stores history data 124. In the history data 124, a history of operation of opening/closing a door, a history of other operation information, a history of various measured values, and/or the like are described in association with the identification information of the refrigerator 200. Note that the history information may be stored in association with day of the week data, month data, weekday-holiday data, season data, weather data, and/or the like.

Furthermore, as shown in FIG. 11, the memory 120 also stores opening/closing possibility data 125. The opening/closing possibility data 125 describes information for identifying a time zone in which the possibility is high that the door of the refrigerator is opened/closed in association with the identification information of the refrigerator 200. In the present embodiment, based on the history of opening/closing of the door of the refrigerator 200 in a period of about several weeks, information indicating the possibility of opening/closing the door is stored every hour.

For example, each time one hour elapses, the CPU 110 calculates the possibility that the door of the refrigerator 200 is opened/closed in this one-hour time zone based on new information as to whether the door of the refrigerator 200 is opened/closed in the present one-hour period and accumulated information regarding the same time zone in the past, and the CPU 110 updates the opening/closing possibility data 125 according to the calculated possibility. Note that the opening/closing possibility data 125 may be information indicating the possibility that the door of the refrigerator 200 is opened/closed in one hour, or may be information indicating the possibility that the door of the refrigerator 200 is opened/closed in a period defined differently, or may be information indicating a time zone in which the possibility is equal to or greater than a predetermined value. The information may be stored in association with day of the week data, month data, weekday-holiday data, season data, weather data, and/or the like.

Referring again to FIG. 6, the operation unit 140 accepts an instruction issued by a service manager and inputs this instruction to the CPU 110.

The communication interface 160 transmits data output from the CPU 110 to another apparatus such as the refrigerator 200, the communication terminal 300 or the like, via the Internet, a carrier network, a router, and/or the like. Conversely, the communication interface 160 receives data from another apparatus such as the refrigerator 200, the communication terminal 300, or the like, via the Internet, the carrier network, the router, and/or the like, and transfers the received data to the CPU 110.

Information Processing in Watching Server 100

Figure 12:
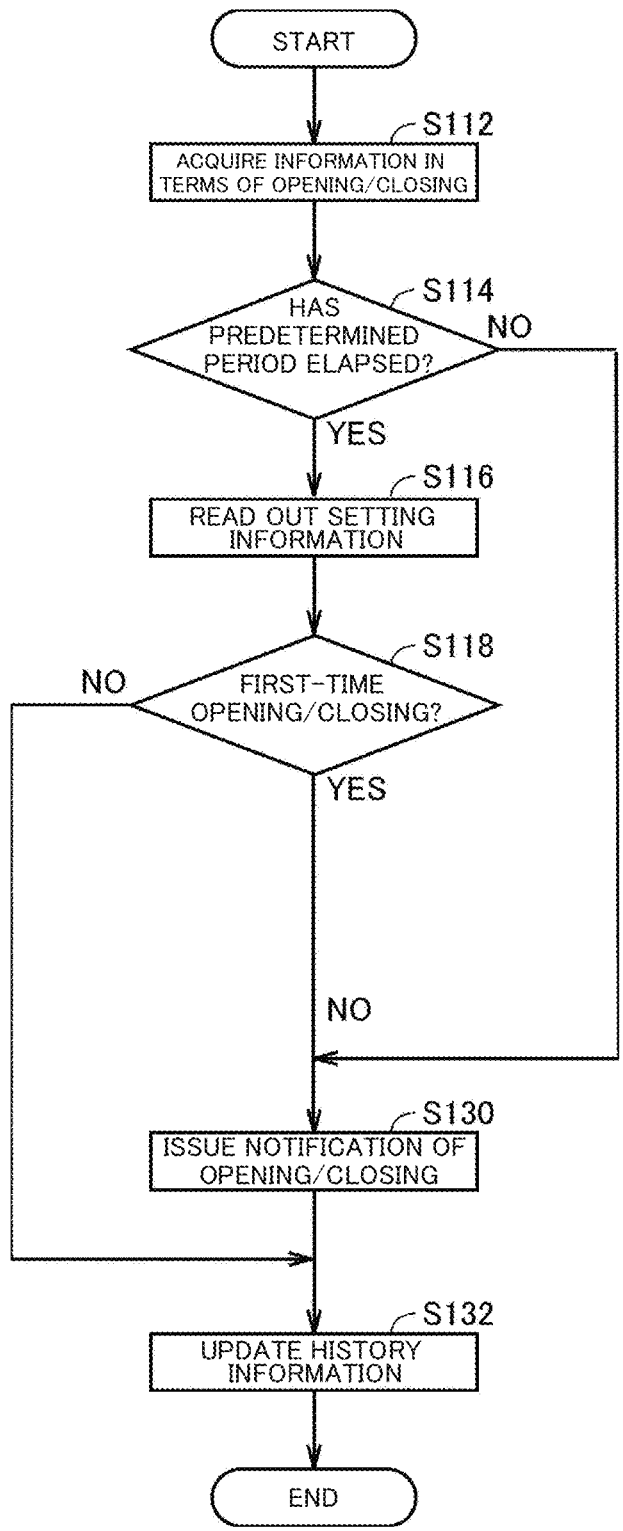
FIG. 12 is a flow chart illustrating information processing relating to an opening/closing occurrence notification according to the first embodiment.

Next, information processing in the watching server 100 is described. First, referring to FIG. 12, when the CPU 110 of the watching server 100 according to the present embodiment receives data indicating that the door is opened from the refrigerator 200 via the communication interface 160, the CPU 110 performs a process according to a program stored in the memory 120 as described below.

The CPU 110 receives information indicating that the door is opened/closed from the refrigerator 200 via the communication interface 160 (step S112). The CPU 110 refers to the pairing data 123 and identifies the communication terminal 300 paired with the refrigerator 200. The CPU 110 then determines whether a predetermined period has elapsed since the pairing (step S114). The predetermined period may be, for example, 24 hours.

In a case where the predetermined period has not yet elapsed since the pairing (in a case where the determination result in step S114 is NO), the CPU 110 sends, via the communication interface 160, a notification to the communication terminal 300 paired with the refrigerator 200 to notify that the door of the refrigerator 200 is opened/closed (step S130). The CPU 110 then updates the history data 124 and the opening/closing possibility data 125 based on the information received this time on opening/closing of the door (step S132). The CPU 110 waits for next data from the refrigerator 200 to be received via the communication interface 160.

Note that in a case where the CPU 110 determines, as a result of referring to the pairing data 123 and the history data 124, that the door has not been opened even once until a predetermined period, for example, 24 hours, has elapsed since the pairing, the CPU 110 may issue, via the communication interface 160, a notification that the door of the refrigerator 200 has not been opened even once until a predetermined period has elapsed since the pairing.

In the present embodiment, as described above, it is allowed to issue an additional notification regarding the opening/closing of the door in a predetermined period since the pairing, which makes it easy for the second user to understand that the watching setting is made correctly.

In a case where the predetermined period has elapsed since the pairing (in a case where the determination result in step S114 is YES), the CPU 110 refers to the pairing data 123 and reads out setting information corresponding to the refrigerator 200 and the communication terminal 300 regarding notification frequency and/or the like (step S116). The CPU 110 determines whether the door of the refrigerator 200 is opened/closed for the first time in a time zone of current interest (step S118).

In a case where the door of the refrigerator 200 is opened/closed for the first time in the time zone of current interest (in a case where the determination result in step S118 is YES), the CPU 110 sends, via the communication interface 160, a notification to the communication terminal 300 paired with the refrigerator 200 to notify that the door of the refrigerator 200 is opened/closed for the first time in the time zone of interest of the day (step S130). The CPU 110 then updates the history data 124 and the opening/closing possibility data 125 based on the information on opening/closing of the door accepted this time (step S132). The CPU 110 then waits for next data from the refrigerator 200 to be received via the communication interface 160.

In a case where the opening/closing of the door of the refrigerator 200 is not the first-time occurrence in the time zone of interest (in a case where the determination result in step S118 is NO), the CPU 110 then updates the history data 124 and the opening/closing possibility data 125 based on the information received this time on opening/closing of the door this time (step S132). The CPU 110 then waits for next data from the refrigerator 200 to be received via the communication interface 160.

Figure 13:
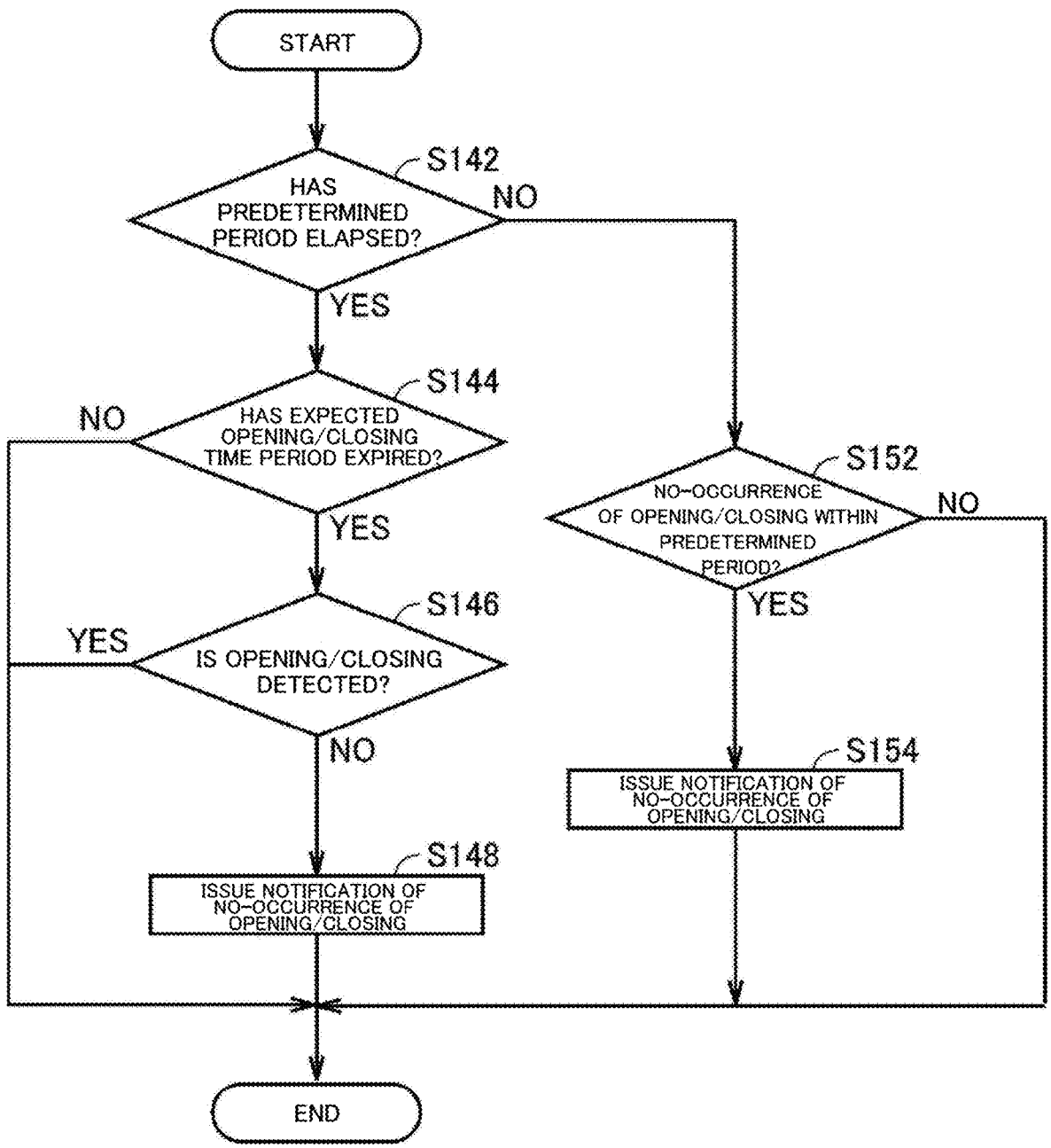
FIG. 13 is a flow chart illustrating information processing relating to a non-occurrence of opening/closing notification according to the first embodiment.

In the present embodiment, by learning the history of the opening/closing operation on the door of the refrigerator 200 in the past, that is, by using the opening/closing possibility data 125 or the like, the CPU 110 of the watching server 100 also performs a process shown in FIG. 13.

Each time a first predetermined period elapses, for example, each time elapse of 10 minutes occurs, the CPU 110 refers to the device information data 122 individually for each refrigerator 200, and determines whether a second predetermined period, for example, 2 weeks, has elapsed since the start of the learning on the history of opening/closing of the door of the refrigerator 200 (step S142).

In a case where the second predetermined period has elapsed since the start of the learning on the history of opening/closing of the door of the refrigerator 200 (in a case where the determination result in step S142 is YES), the CPU 110 refers to the opening/closing possibility data 125, and determines whether a time zone, in which the possibility that the door of the refrigerator 200 is opened/closed is higher than or equal to a first predetermined value, for example, 100%, 75%, or the like, has expired in the first predetermined period as measured back from the present time (step S144). Note that the time zone subjected to the check of the elapse described above may be given by a particular time zone plus 1 hour where the particular time zone is indicated by the opening/closing possibility data 125 that the possibility that the door of the refrigerator 200 is opened/closed in this particular time zone is higher than or equal to the first predetermined value, or may be given by the particular time zone {±}1 hour where the possibility that the door of the refrigerator 200 is opened/closed in this particular time zone is higher than or equal to the first predetermined value.

In a case where the time zone in which the possibility that the door of the refrigerator 200 is opened/closed is higher than or equal to the first predetermined value has not yet expired in the first predetermined period (in a case where the determination result in step S144 is NO), the CPU 110 advances the process to check a next refrigerator 200.

In a case where the time zone in which the possibility that the door of the refrigerator 200 is opened/closed is higher than or equal to the first predetermined value has expired in the first predetermined period (in a case where the determination result in step S144 is YES), the CPU 110 refers to the history data 124 and determines whether the door of the refrigerator 200 is opened/closed in the time zone of current interest (step S146). In a case where the door of the refrigerator 200 is opened/closed in the time zone of current interest (in a case where the determination result in step S146 is YES), the CPU 110 advances the process to check a next refrigerator 200.

In a case where the door of the refrigerator 200 is not opened/closed in the time zone of current interest (in a case where the determination result in step S146 is NO), the CPU 110 sends a notification via the communication interface 160 to the communication terminal 300 paired with the refrigerator 200 to notify that the door of the refrigerator 200 is not opened/closed in the day of interest in the time zone in which the door of the refrigerator 200 is usually opened/closed (step S148). The CPU 110 then advances the process to check a next refrigerator 200.

In a case where the second predetermined period has not elapsed since the start of the learning on the history of opening/closing of the door of the refrigerator 200 (in a case where the determination result in step S142 is NO), the CPU 110 refers to the history data 124 and determines whether the door of the refrigerator 200 has not been opened/closed for a continuous period equal to or longer than a third predetermined period, for example, 24 hours (step S152). In a case where the period, for which the door of the refrigerator 200 has not been opened/closed, is not, at a point of time of interest, as long as the third predetermined period, (in a case where the determination result in step S152 is NO), the CPU 110 advances the process to check a next refrigerator 200.

In a case where the period, for which the door of the refrigerator 200 has not been opened/closed, is equal to or longer than the third predetermined period, (in a case where the determination result in step S152 is YES), the CPU 110 sends a notification via the communication interface 160 to the communication terminal 300 paired with the refrigerator 200 to notify that the door of the refrigerator 200 has not been opened/closed in the period equal to or longer than the third predetermined period (step S154). The CPU 110 then advances the process to check a next refrigerator 200.

Function of Automatic Restriction of Watching Functions

Figure 14:
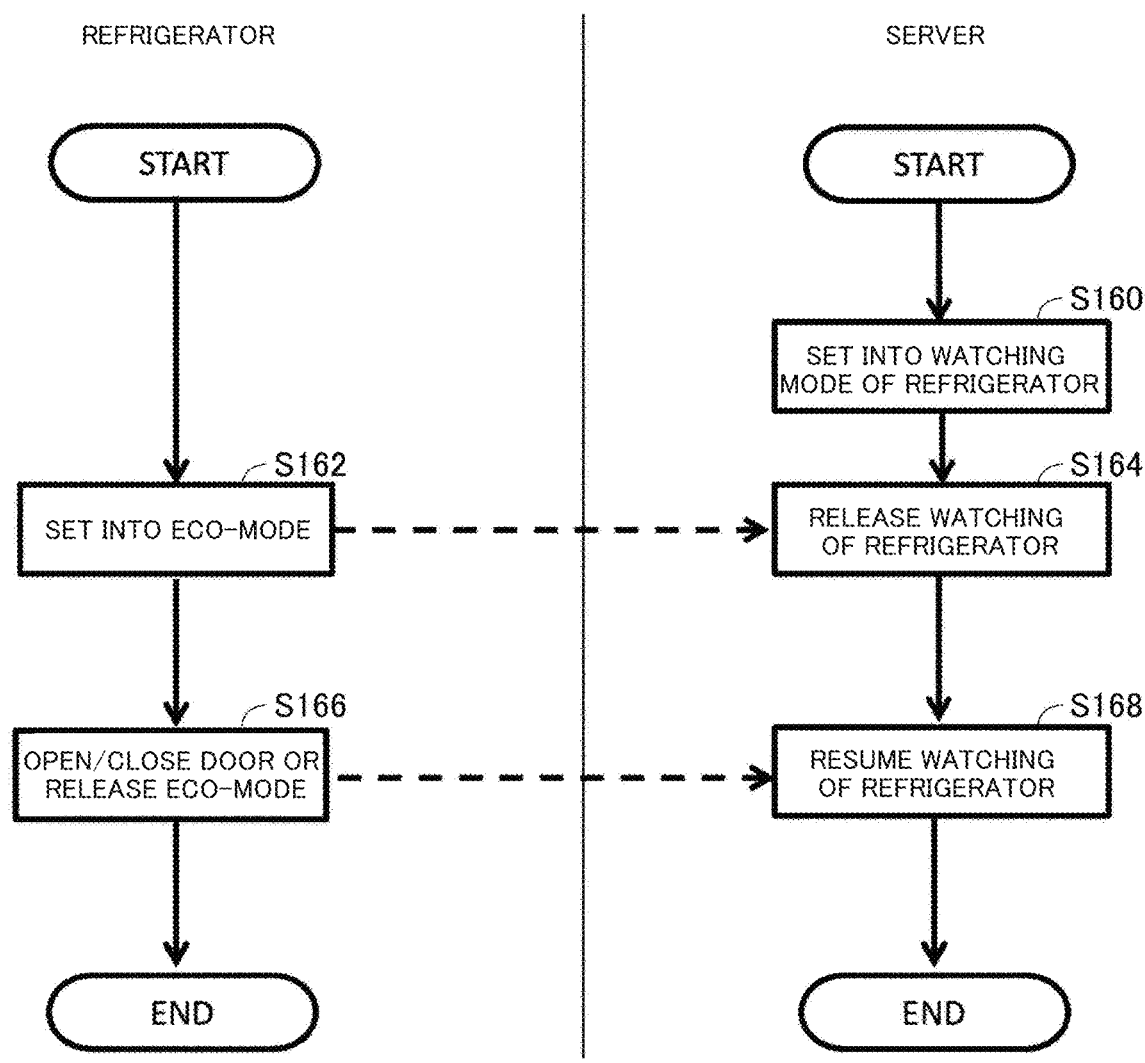
FIG. 14 is a sequence diagram relating to a function of automatic restriction of watching functions according to the first embodiment.

A function of automatically restricting the notification regarding the watching in the network system 1 according to the present embodiment is described below. Referring to FIG. 14, first, the watching server 100 accepts setting of the watching mode of the refrigerator 200 (step S160).

In this state, if a user operates the operation unit 240 of the refrigerator 200 such that the refrigerator 200 starts an eco-mode operation (step S162), the CPU 210 of the refrigerator 200 sends a notification to the watching server 100 via the communication interface 260 to notify that the eco-mode operation is started. Note that an instruction to start the eco-mode operation may be issued by the first user by inputting the instruction via a voice to the refrigerator 200, or by the first user by inputting the instruction via a communication terminal such as a smartphone, or by the second user by inputting the instruction via the communication terminal 300.

When the CPU 110 of the watching server 100 receives, via the communication interface 160, information indicating that the eco-mode operation is started, the CPU 110 restricts the functions of the watching service on the refrigerator 200 step S164). For example, the refrigerator 200 or the watching server 100 may temporarily stop one of steps shown in FIG. 12 or may temporarily stop the process shown in FIG. 13.

The restriction of the functions of the watching service may be performed such that the notification regarding the watching service from the watching server 100 to the communication terminal 300 is entirely stopped while continuing the accumulation of the history of the opening/closing operation, the learning of the dependence of the opening/closing on the time zone, and/or the like, or such that only part of the notification regarding the watching service from the watching server 100 to the communication terminal 300 is stopped, or such that transmission of data regarding the watching service from the watching server 100 to the communication terminal 300 is stopped.

In alternative examples, the restriction of the functions of the watching service may be made such that part of the communication between the watching server 100 and the refrigerator 200 is stopped while the refrigerator 200 continues the accumulation of the history of the opening/closing operation, or such that the watching service by the watching server 100 or the refrigerator 200 is entirely stopped. That is, depending on the eco-mode operation instruction, the CPU 210 of the refrigerator 200 may stop part or all of the operation retarding the watching service.

When the watching service is being restricted, if a user cancels the eco-mode operation via the operation unit 240 of the refrigerator 200 or if the eco-mode operation is automatically cancelled in response to opening/closing of the door of the refrigerator 200 (step S166), the CPU 210 of the refrigerator 200 sends information to the watching server 100 via the communication interface 260 to notify that the eco-mode operation is cancelled.

When the CPU 110 of the watching server 100 receives, from the refrigerator 200 via the communication interface 160, the information indicating that the eco-mode operation is cancelled, the CPU 110 returns the watching service regarding the refrigerator 200 to a normal mode (step S168).

This makes it possible to reduce the probability that when the first user goes on a trip or the like without performing the operation to cancel the watching mode, the notification in step S148 in FIG. 13 is sent to the second user many times.

Furthermore, when the first user gets back home, even if the first user forgets to perform an operation to restart the watching mode, the operation returns to the watching mode in response to opening/closing the door of the refrigerator 200.

Second Embodiment

Figure 15:
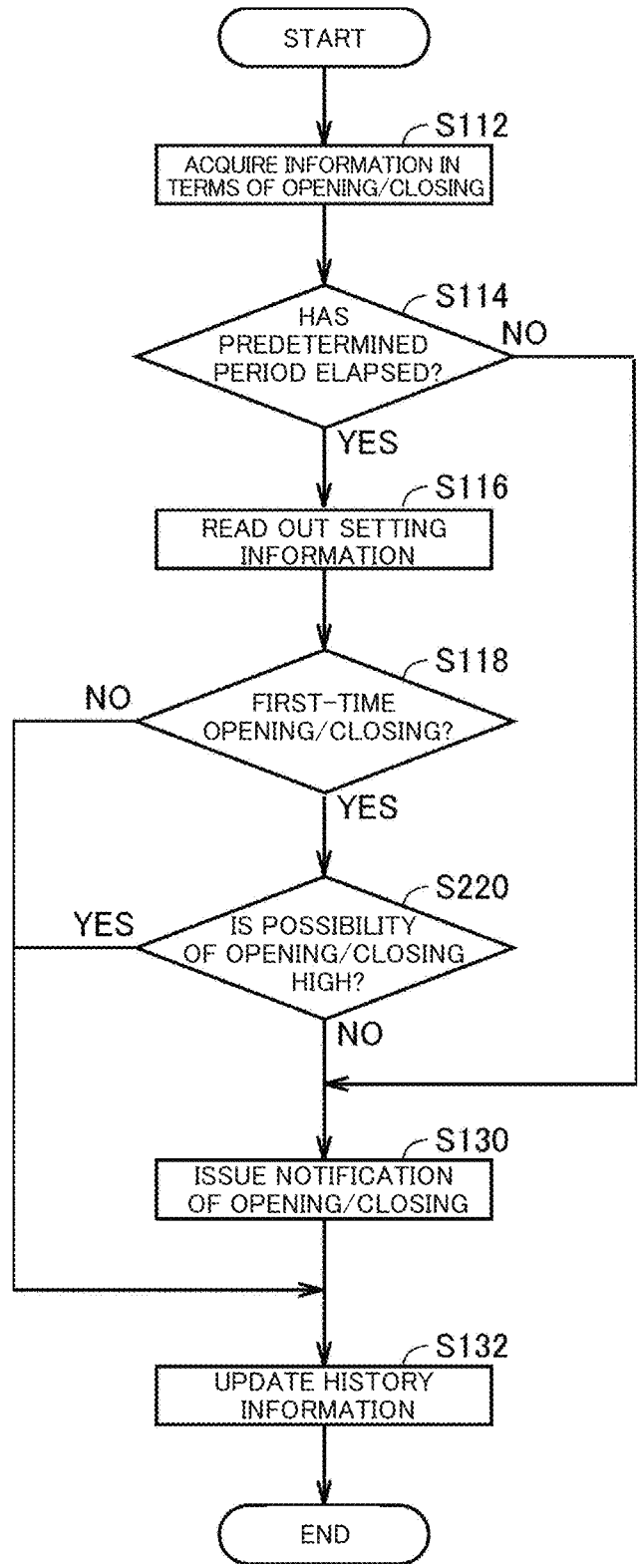
FIG. 15 is a flow chart illustrating information processing relating to an opening/closing occurrence notification according to a second embodiment.

In addition to the first embodiment, the present disclosure provides a second embodiment in which, as illustrated in FIG. 15, even in a case where the door of the refrigerator 200 is opened/closed for the first time in the time zone of current interest (in a case where the determination result in step S118 is YES), if the possibility that the door of the refrigerator 200 is opened/closed in this time zone is equal to or higher than a first predetermined value, for example, 75% (in a case where the determination result in step S220 is YES), the CPU 110 may not issue a notification to the communication terminal 300.

That is, in a case where the door of the refrigerator 200 is opened/closed for the first time in the time zone of current interest, if the possibility that the door of the refrigerator 200 is opened/closed is lower than the first predetermined value, then the CPU 110 of the watching server 100 may send a notification to the communication terminal 300 via the communication interface 160 to notify that the door of the refrigerator 200 is opened.

However, in a case where the door of the refrigerator 200 is opened/closed for the first time in the time zone of current interest, or in a case where the door is opened when the possibility that the door of the refrigerator 200 is opened/closed is lower than the first predetermined value, the CPU 110 may send a notification to the communication terminal 300 via the communication interface 160 to notify that the door of the refrigerator 200 is opened.

Alternatively, the notification may be different depending on whether the possibility that the door of the refrigerator 200 is opened/closed is higher than or equal to the first predetermined value or lower than the first predetermined value. For example, in a case where the determination result in step S220 is YES, a message saying "the door is opened as usual" may be sent, but in a case where the determination result in step S220 is NO, a message saying "the door is opened today" may be sent.

Third Embodiment

Figure 16:
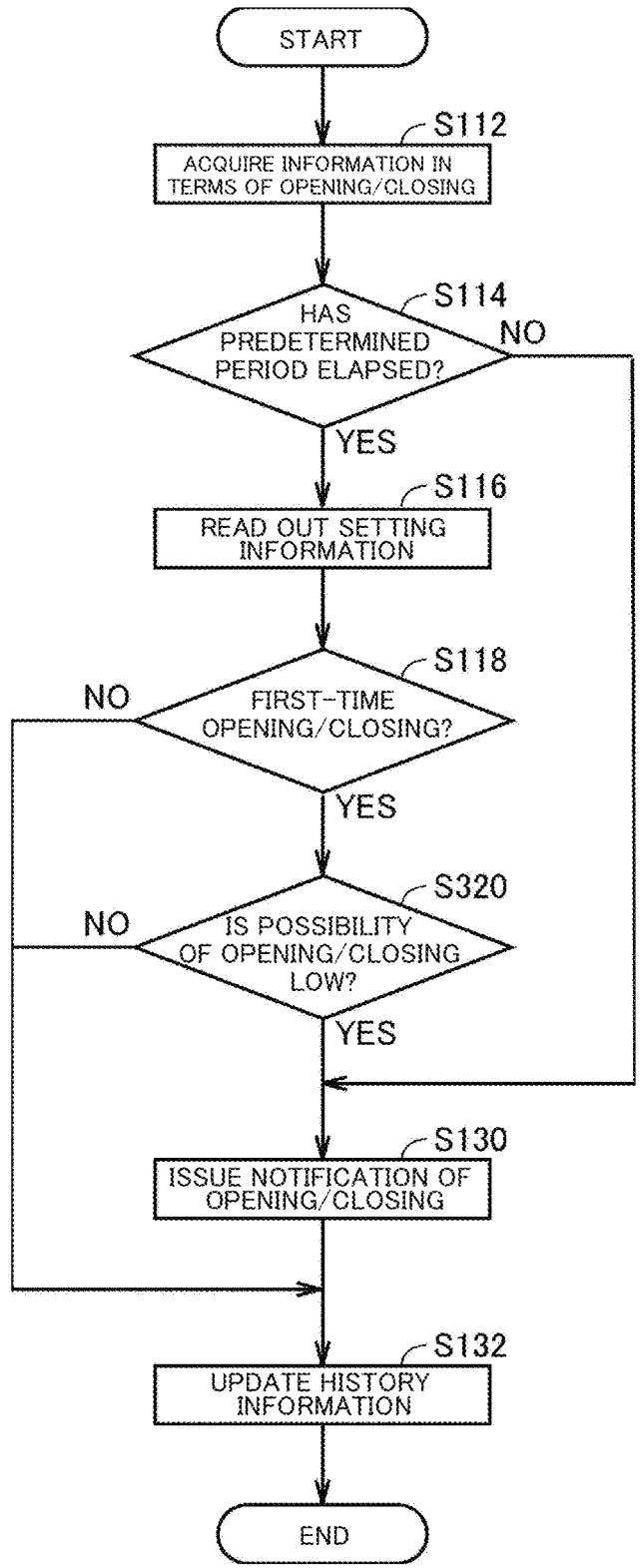
FIG. 16 is a flow chart illustrating an information processing relating to an opening/closing occurrence notification according to a third embodiment.

In an alternatively embodiment, that is, in a third embodiment, the opening/closing possibility data 125 may further include information for specifying a time zone in which the possibility that the door is opened is low in association with the identification information of the refrigerator 200. In this case, as shown in FIG. 16, when the door of the refrigerator 200 is opened (in a case where the determination result in step S118 is YES), the CPU 110 may refer to the opening/closing possibility data 125 to determine whether the door is opened in a time zone in which the possibility that the door of the refrigerator 200 is opened/closed is lower than a second predetermined value (for example, 25%) smaller than the first predetermined value (in a case where the determination result in step S320 is YES), a notification may be sent (step S130).

That is, in a case where the door of the refrigerator 200 is opened/closed for the first time in the time zone of current interest, if the possibility that the door of the refrigerator 200 is opened/closed is lower than the second predetermined value, the CPU 110 of the watching server 100 may send a notification to the communication terminal 300 via the communication interface 160 to notify that the door of the refrigerator 200 is opened.

However, in a case where the door of the refrigerator 200 is opened/closed for the first time in the time zone of current interest, or in a case where the door is opened when the possibility that the door of the refrigerator 200 is opened/closed is lower than the second predetermined value, the CPU 110 may send a notification to the communication terminal 300 via the communication interface 160 to notify that the door of the refrigerator 200 is opened.

In alternatively examples, the CPU 110 may change the message depending on the possibility that the door is opened in a time zone in which the door is actually opened. For example, in a case where the possibility that the door of the refrigerator 200 is opened/closed is higher than or equal to the first predetermined value, the CPU 110 may send a message saying the door is opened also today". In a case where the possibility that the door of the refrigerator 200 is opened/closed is lower than the first predetermined value and higher than or equal to the second predetermined value, a message saying "the door is opened today" may be sent. In a case where the possibility that the door of the refrigerator 200 is opened/closed is lower than the second predetermined value, a message saying "the door is unusually opened today" may be sent.

Fourth Embodiment

In the embodiments described above, as in step S114 shown in FIG. 12, the CPU 110 determines whether a predetermined period has elapsed since the pairing. Alternatively, as shown in FIG. 17, the CPU 110 may refer to the pairing data 123 and identify the communication terminal 300 paired with the refrigerator 200, and the CPU 110 may then determine whether the door has been opened/closed a predetermined number of times or more since the pairing (step S414). The predetermined number of times may be, for example, 3 times.

In a case where the door has not been opened/closed the predetermined number of times since the pairing (in a case where the determination result in step S414 is NO), the CPU 110 sends a notification via the communication interface 160 to the communication terminal 300 paired with the refrigerator 200 to notify that the door of the refrigerator 200 is opened (step S130). The CPU 110 then updates the history data 124 and the opening/closing possibility data 125 based on the information on opening/closing of the door accepted this time (step S132). The CPU 110 waits for next data from the refrigerator 200 to be received via the communication interface 160.

In a case where the door has been opened/closed the predetermined number of times or more since the pairing (in a case where the determination result in step S414 is YES), the CPU 110 executes a process in step S116 and processes in following steps.

Fifth Embodiment

In the embodiments described above, as illustrated in FIG. 2, when the first authentication is passed successfully, the watching server 100 controls the communication terminal 300 to output information to instruct to press a specific button of the refrigerator 200. However, when the first authentication is passed successfully, the CPU 110 of the watching server 100 may control, via the communication interface 160, the communication terminal 300 to output information that instructs to open/close a predetermined door of the refrigerator 200.

Based on information received from the watching server 100, the CPU 310 of the communication terminal 300 controls the display 330 to display information specifying the door to be opened first within a predetermined time and/or controls the speaker 370 to output sound/voice information specifying the door to be opened first within the predetermined time. Thus, the first user or the second user can recognize the door to be opened.

Based on a detection result by the door open/close sensor 299, the CPU 210 of the refrigerator 200 transmits information for identifying the opened/closed door to the watching server 100 via the communication interface 260.

The watching server 100 performs a second authentication based on the information on opening/closing received from the refrigerator 200. More specifically, the CPU 110 of the watching server 100 determines whether the specified door is opened within a predetermined time such as 30 minutes since the information for specifying the door to be opened is sent to the communication terminal 300.

When the second authentication is successfully passed, the watching server 100 permits pairing between the refrigerator 200 and the communication terminal 300, and transmits, via the communication interface 160, information indicating this fact to the refrigerator 200 and the communication terminal 300.

That is, when the second user opens the specified door of the refrigerator 200 in the first user's home according to information displayed on the screen of the communication terminal 300, the authentication is successfully performed. In a case where the second user is located away from the refrigerator 200, the second user may send information to the first user via a telephone, SNS, or the like to specify the door to be opened. In response, if the first user opens the specified door of the refrigerator 200, the authentication is successfully performed.

Sixth Embodiment

The structures, the functions, and the operations of the watching server 100, the refrigerator 200, and the communication terminal 300 are not limited to those described in the previous embodiments. For example, the role of an apparatus may be realized by another apparatus. For example, part of the role of the watching server 100 may be performed by another authentication server, the refrigerator 200, or the communication terminal 300. Conversely, part of the role of the refrigerator 200 may be performed by the communication terminal 300 or another appliance control server.

Summary of Embodiments

According to one of the embodiments, a network system includes a refrigerator, a terminal, and a server capable of communicating with the refrigerator and the terminal and configured to provide at least information based on an opening/closing operation of a door of the refrigerator to the terminal. When the refrigerator starts an eco-mode operation, the server remits the operation related to the watching service.

In an embodiment, when an eco-mode start instruction is input to an operation unit of the refrigerator, the server restricts the operation related to the watching service.

According to one of the embodiments, an information processing method includes a process performed by a server, the process including starting a watching service for providing, to a terminal, at least information based on an operation of opening/closing a door of a refrigerator, restricting an operation related to the watching service based on starting of an eco-mode in the refrigerator.

According to one of the embodiments, a server includes a communication interface for communicating with a refrigerator and a terminal, and a processor configured to provide, as a watching service, at least information based on an operation of opening/closing a door of the refrigerator to the terminal via the communication interface, and, when the refrigerator starts an eco-mode, restrict an operation regarding the watching service.

According to one of the embodiments, a refrigerator includes a communication interface for communicating with a server, and a processor configured to provide, as a watching service, at least information based on an operation of opening/closing a door of the refrigerator to the server, and, when an eco-mode is started, restrict an operation regarding the watching service.

The present disclosure contains subject matter related to that disclosed in Japanese Priority Patent Application 2019-016635 filed in the Japan Patent Office on Feb. 1, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A network system comprising:
    a refrigerator in a first user's home;
    a terminal used by a second user; and
    a server capable of communicating with the refrigerator and the terminal and configured to provide, as a watching service, at least information based on an operation of opening and/or closing a door of the refrigerator to the terminal, the information including a notification that the door of the refrigerator is not opened and/or closed in a time zone in which the door of the refrigerator is usually opened and/or closed, the server being configured to, when the refrigerator starts an eco-mode, restrict providing the information including the notification.

2. The network system according to claim 1, wherein when an eco-mode start instruction is input to an operation unit of the refrigerator, the server restricts the operation related to the watching service.

3. An information processing method comprising a process performed by a server, the process comprising:
    starting a watching service for providing, to a terminal used by a second user, at least information based on an operation of opening and/or closing a door of a refrigerator in a first user's home, the information including a notification that the door of the refrigerator is not opened and/or closed in a time zone in which the door of the refrigerator is usually opened and/or closed; and
    restricting providing the information including the notification based on starting of an eco-mode in the refrigerator.

4. A server comprising:
    a communication interface for communicating with a refrigerator in a first user's home and a terminal used by a second user; and
    a processor configured to provide, as a watching service, at least information based on an operation of opening and/or closing a door of the refrigerator to the terminal via the communication interface, the information including a notification that the door of the refrigerator is not opened and/or closed in a time zone in which the door of the refrigerator is usually opened and/or closed, and, when the refrigerator starts an eco-mode, restrict providing the information including the notification.

5. A refrigerator comprising:
    a communication interface for communicating with a server; and
    a processor configured to provide, as a watching service, at least information based on an operation of opening and/or closing a door of the refrigerator to the server, the information including a notification that the door of the refrigerator is not opened and/or closed in a time zone in which the door of the refrigerator is usually opened and/or closed, and, when an eco-mode is started, restrict providing the information including the notification.

* * * * *